(12) United States Patent
Greenberg et al.

(10) Patent No.: US 11,589,248 B1
(45) Date of Patent: Feb. 21, 2023

(54) METHOD AND APPARATUS FOR SYSTEM STATE DISCOVERY

(71) Applicant: Raytheon Company, Waltham, MA (US)

(72) Inventors: Adam Hodge Greenberg, Los Angeles, CA (US); Richard A. Loveless, Redondo Beach, CA (US)

(73) Assignee: Raytheon Company, Waltham, MA (US)

( * ) Notice: Subject to any disclaimer, the term of this patent is extended or adjusted under 35 U.S.C. 154(b) by 114 days.

(21) Appl. No.: 17/178,369

(22) Filed: Feb. 18, 2021

(51) Int. Cl.
*H04W 24/08* (2009.01)
(52) U.S. Cl.
CPC .................................. *H04W 24/08* (2013.01)
(58) Field of Classification Search
None
See application file for complete search history.

(56) References Cited

U.S. PATENT DOCUMENTS

2012/0069806 A1* 3/2012 Norlen .................. H04W 16/14
370/437
2014/0066086 A1 3/2014 Jo et al.

FOREIGN PATENT DOCUMENTS

WO WO 2007/009043 A1 1/2007

\* cited by examiner

*Primary Examiner* — Saad Khawar
(74) *Attorney, Agent, or Firm* — Daly Crowley Mofford & Durkee, LLP

(57) ABSTRACT

A method for identifying a current state of an electronic system is provided. The method includes identifying a pool of candidate states of the electronic system, selecting a probing parameter in accordance with a model, and probing the electronic system based on the selected probing parameter. When the probing yields a positive result, all candidate states that are not intersected by the probing parameter are removed from the pool. When the probing parameter yields M negative results, all candidate states that are intersected by the probing parameter are removed from the pool, where $M \geq 1$. A last remaining candidate state in the pool is identified as the current state of the electronic system. The model is based on at least one of a probability that the probing would yield a false-negative result or a probability that a result of the probing would be interpreted and/or processed incorrectly.

20 Claims, 5 Drawing Sheets

METHOD AND APPARATUS FOR SYSTEM STATE DISCOVERY

STATEMENT REGARDING FEDERALLY SPONSORED RESEARCH

This case is a subject invention under Government Contract. Funding Source: CRAD; Contract number: Withheld PO Z7TSAAAP. The Government has certain rights in the invention.

BACKGROUND

In many system engineering contexts, the current state of a system may be discovered by probing the system and observing the system's response. For example, in the communications domain, probing may be used to identify the operating channel of an access point or a base station. After the operating channel is identified, the operating channel can be used to transmit and receive messages from the access point or base station.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the disclosure.

According to aspects of the disclosure, a method is provided for identifying a current state of an electronic system, comprising: identifying a pool of candidate states of the electronic system; selecting a probing parameter in accordance with a model that is based on at least one of: (i) a probability that probing the electronic system would yield a false-negative result, or (ii) a probability that a result of probing the electronic system would be interpreted and/or processed incorrectly; probing the electronic system based on the selected probing parameter; when probing the electronic system based on the selected probing parameter yields a positive result, removing, from the pool, all candidate states that are not intersected by the probing parameter; when probing the electronic system based on the selected probing parameter yields M negative results, removing, from the pool, all candidate states that are intersected by the probing parameter, where M is an integer, and M≥1; and identifying a last remaining candidate state in the pool as the current state of the electronic system.

According to aspects of the disclosure, an apparatus is provided, comprising: a memory; and at least one processor that is operatively coupled to the memory, the at least one processor being configured to perform the operations of: identifying a pool of candidate states of an electronic system; selecting a probing parameter in accordance with a model that is based on at least one of: (i) a probability that probing the electronic system would yield a false-negative result, or (ii) a probability that a result of probing the electronic system would be interpreted and/or processed incorrectly by the apparatus; probing the electronic system based on the selected probing parameter; when probing the electronic system based on the selected probing parameter yields a positive result, removing, from the pool, all candidate states that are not intersected by the probing parameter; when probing the electronic system based on the selected probing parameter yields M negative results, removing, from the pool, all candidate states that are intersected by the probing parameter, where M is an integer, and M≥1; and identifying a last remaining candidate state in the pool as a current state of the electronic system.

According to aspects of the disclosure, a non-transitory computer-readable medium is provided that stores one or more processor-executable instructions, which, when executed by at least one processor, cause the at least one processor to perform the operations of: identifying a pool of candidate states of an electronic system; selecting a probing parameter in accordance with a model that is based on at least one of: (i) a probability that probing the electronic system would yield a false-negative result, or (ii) a probability that a result of probing the electronic system would be interpreted and/or processed incorrectly by the at least one processor; when probing the electronic system based on the selected probing parameter yields a positive result, removing, from the pool, all candidate states that are not intersected by the probing parameter; when probing the electronic system based on the selected probing parameter yields M negative results, removing, from the pool, all candidate states that are intersected by the probing parameter, where M is an integer, and M≥1; and identifying a last remaining candidate state in the pool as a current state of the electronic system.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figure 1:
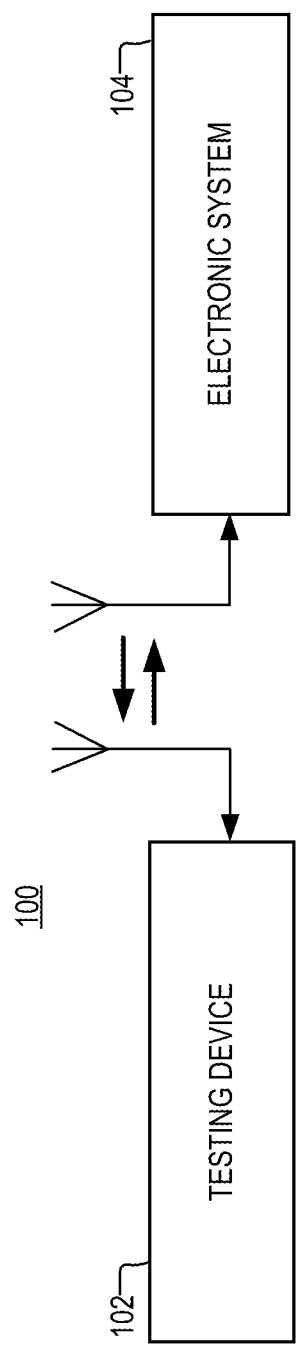
FIG. 1 is a diagram of an example of a system, according to aspects of the disclosure.

FIG. 1 is a diagram of an example of a system 100, according to aspects of the disclosure. As illustrated, the system 100 may include a testing device 102 and an electronic system 104. In operation, the testing device 102 may execute a process for discovering the current state of the electronic system 104, such as the process 400, which is discussed further below with respect to FIG. 4. According to the present example, the electronic system 104 includes a wireless communications system. However, it will be understood that alternative implementations are possible in which the electronic system is 104 includes another type of system.

According to the present example, the testing device 102 is coupled to the electronic system 104 via a wireless medium. However, it will be understood that alternative implementations are possible in which the testing device 102 is coupled to the electronic system 104 a different medium, such as a wired medium or an optical medium.

Figure 2:
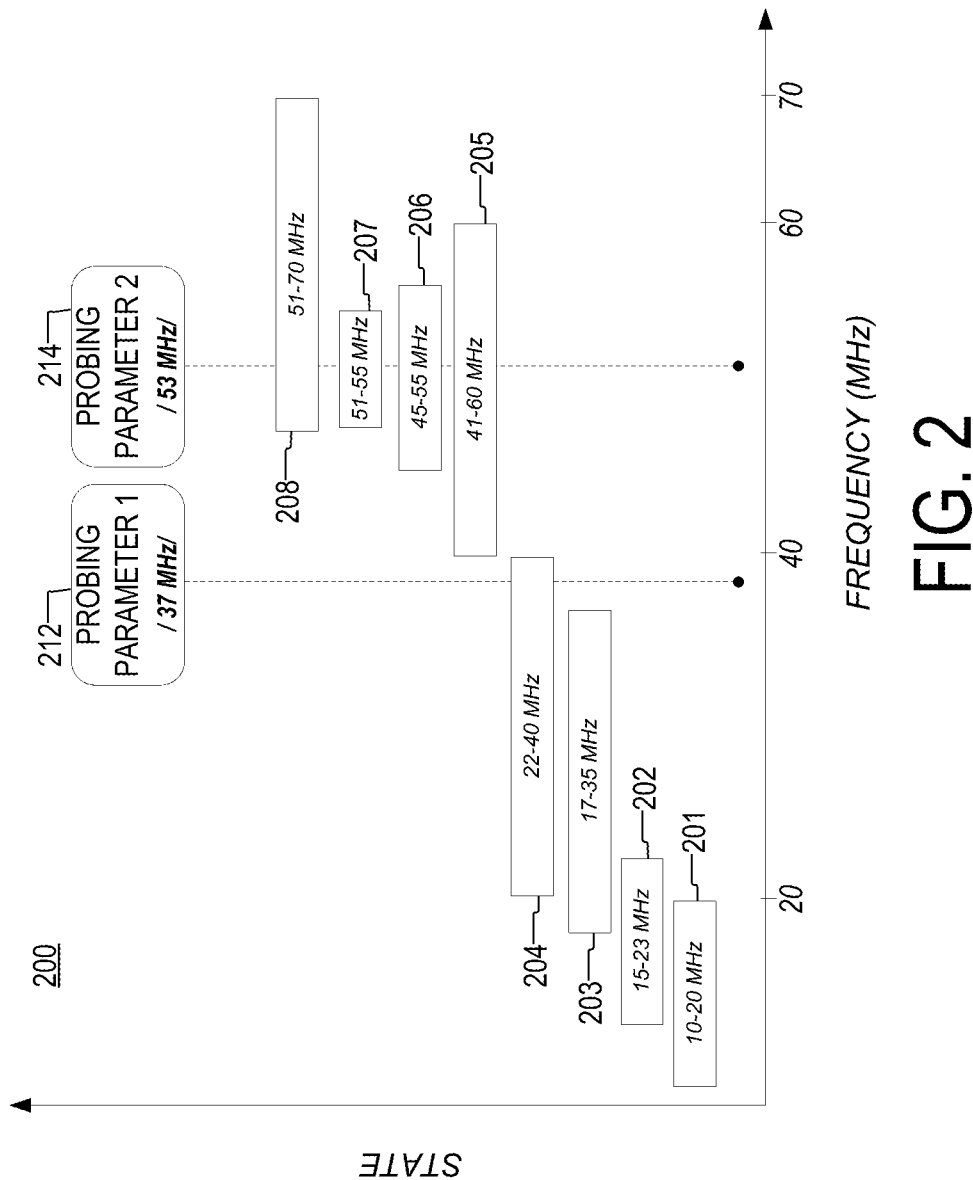
FIG. 2 is a plot of a plurality of states of an electronic system, according to aspects of the disclosure.

FIG. 2 shows a plot 200 that illustrates an example of a set of possible states, which can be assumed by the electronic system 104. According to the example of FIG. 2, the electronic system 104 may be in one of states 201-208. When the electronic system 104 is in state 201, the electronic system 104 may listen for messages (and/or signals) that are transmitted in the frequency band between 10 MHz and 20 MHz. When the electronic system 104 is in state 202, the electronic system 104 may listen for messages (and/or signals) that are transmitted in the frequency band between 15 MHz and 23 MHz. When the electronic system 104 is in state 203, the electronic system 104 may listen for messages (and/or signals) that are transmitted in the frequency band between 17 MHz and 35 MHz. When the electronic system 104 is in state 204, the electronic system 104 may listen for messages (and/or signals) that are transmitted in the frequency band between 22 MHz and 40 MHz. When the electronic system 104 is in state 205, the electronic system 104 may listen for messages (and/or signals) that are transmitted in the frequency band between 41 MHz and 60 MHz. When the electronic system 104 is in state 206, the electronic system 104 may listen for messages (and/or signals) that are transmitted in the frequency band between 45 MHz and 55 MHz. When the electronic system 104 is in state 207, the electronic system 104 may listen for messages (and/or signals) that are transmitted in the frequency band between 51 MHz and 55 MHz. And when the electronic system 104 is in state 208, the electronic system 104 may listen for messages (and/or signals) that are transmitted in the frequency band between 55 MHz and 55 MHz. In other words, each of states 201-208 may correspond to a different operating channel of the electronic system 104. As illustrated in FIG. 2, some of the states of the electronic system 104 may overlap, and the same frequency may belong to multiple states (for instance, 53 MHz is contained by all of states 205-208, etc.).

FIG. 2 further shows an example of a probing parameter 212. According to the present example, the probing parameter 212 has a value of 37 MHz. The probing parameter may be used as a basis for probing the electronic system 104. More particularly, the testing device 102 may probe the electronic system 104 based on the probing parameter 212 by transmitting a test message (or signal) to the electronic system 104 that is modulated at 37 Mhz. If state 204 is the current state of the electronic system 104, the electronic system 104 will be listening in the band between 22 MHz and 40 MHz. Accordingly, the electronic system 104 may detect the test message (or signal) and transmit a response. In some implementations, the response may not contain any information, other than an indication that the test message was received. However, it will be understood that the present disclosure is not limited to any specific type of response. On the other hand, if the current state of the electronic system 104 is any of states 201-203 and states 205-208, the frequency of the test message (37 MHz) will fall outside of the frequency band, which the electronic system 104 is listening in. As a result, the test message may remain unnoticed by the electronic system 104.

FIG. 2 further shows an example of a probing parameter 214. According to the present example, the probing parameter 214 has a value of 53 MHz. The probing parameter may be used as a basis for probing the electronic system 104. More particularly, the testing device 102 may probe the electronic system 104 based on the probing parameter 214 by transmitting a test message (or signal) to the electronic system 104 at 53 Mhz. If any of the states 205-208 is the current state of the electronic system 104, the frequency of the test message (e.g., 53 MHz) will be inside the frequency range in which the electronic system 104 is listening, and the electronic system 104 may return a response to the test message. If any of states 201-204 is the current state of the electronic system 104, the frequency of the test message (e.g., 53 MHz) will be outside the frequency range in which the electronic system 104 is listening, and the electronic system 104 will not return a response. When the electronic system fails to return a response to a probe within a predetermined timeout period, a timeout event may be generated at the electronic device that is associated with the probe.

Probing the electronic system 104 based on a given probing parameter may yield one of: (i) a positive result, (ii) a negative result, and (iii) a false-negative result. Probing the electronic system 104 based on a given probing parameter may yield a positive result when the testing device 102 receives a response from the electronic system 104, which indicates that the probing parameter intersects the current state of the electronic system 104. Probing the electronic system 104 based on the given probing parameter may yield a negative result, when: (i) a response is received from the electronic system 104 that indicates that the probing parameter does not intersect the current state of the electronic system 104 and/or (ii) no response is received from the electronic system 104 within a timeout period. Probing the electronic system 104 based on the given probing parameter may yield a false-negative result when the electronic system 104 transmits a response to the probe, but the response is not received by the testing device 102 before the timeout period is over. A false-negative result may be caused by a delay in the transmission of the response and/or noise.

According to the example of FIG. 2, probing the electronic system 104 based on any of the probing parameters 112 and 114 includes a generating a message (or signal) that is modulated at the frequency (which constitutes the probing parameter). Additionally or alternatively, in some implementations, probing an electronic system based on a probing parameter may include generating a message (or signal) that is modulated based on the probing parameter. Additionally or alternatively, in some implementations, probing an electronic system based on a probing parameter may include generating a message (or signal) that includes or contains (or otherwise indicates) the probing parameter. Stated succinctly, the present disclosure is not limited to any specific method for probing an electronic system based on a probing parameter.

A given probing parameter may or may not intersect one or more states of the electronic system 104. A state of the electronic system 104 may include a range of values that measure a particular quantity (in the example of FIG. 2 the quantity is frequency). A probing parameter may include a value that measures the same quantity as the state. A probing parameter may intersect a state when: (i) the probing parameter is greater than or equal to the lower bound of the range, which constitutes the state, and (ii) the probing parameter is less than or equal to the upper bound of the range, which constitutes the state. In the example of FIG. 2, the probing parameter 212 intersects the state 202. In the example of FIG. 2, the probing parameter 212 does not intersect any of the states 201-203 and 205-208. In the example of FIG. 2, probing parameter 212 intersects the states 205-208. In the example of FIG. 2, the probing parameter 212 does not intersect any of the states 201-204.

Intersection count is a metric that describes the relationship between a given probing parameter and a set of states of the electronic system 104. The intersection count of a given probing parameter with respect to the set of states may include any indication of the number of states in the set that are intersected by the probing parameter. The intersection count of the given probing parameter may be expressed in various ways. For example, the intersection count of the given probing parameter may be a number that is equal to the fraction of states in the set that are intersected by the probing parameter. For instance, in such implementations, an intersection count of 0.6 may indicate that 60% of the states in the set are intersected by the probing parameter, whereas an intersection count of 0.75 may indicate that 75% percent of the states in the set are intersected. As another example, the intersection count of the given probing parameter may be a number that is equal to an absolute count of the states in the set that are intersected by the probing parameter. For instance, in such implementations, an intersection count of 7 may indicate that 7 of the states in the set are intersected by the probing parameter, whereas an intersection count of 9 may indicate that 9 of the states in the set are intersected. In the example of FIG. 2, probing parameter 212 has an intersection count of 1 (or 0.125) and probing parameter 212 has an intersection count of 4 (or 0.5).

The testing device 102, as noted above, is configured to discover the current state of the electronic system 104. This function may be accomplished by obtaining a pool of candidate states and eliminating candidate states from the pool until only one candidate state is left remaining in the pool. The candidate states in the pool may be eliminated by repeatedly executing the following sequence of steps: (1) identify an optimal intersection count for a pool of candidate states of the electronic system 104, (2) select a probing parameter that has the optimal intersection count, (3) probe the electronic system 104 based on the probing parameter, (4) when the probe yields a positive result, remove, from the pool, all candidate states that do not intersect the probing parameter, and (5) when the probe yields a negative result, remove, from the pool, all candidate states that do intersect the probing parameter. In some implementations, the "optimal intersection count" may include the intersection count that yields the largest expected decrease in the number of states in the candidate pool. In some implementations, when the probe yields a negative result the probe may be repeated one or more times, and the candidate states that do not intersect the probing parameter may be removed from the pool only when all repeats yield a negative result. Repeating the probe multiple times would reduce the likelihood of (or ideally prevent) the testing device from acting on a false-negative result.

According to the present disclosure, it has been observed that the optimal intersection count for the pool of candidate states depends on the probability of a probe of the electronic system 104 yielding a false-negative result. As can be readily appreciated, in the absence of false-negative results, the optimal intersection count is equal to half the size of the candidate pool, meaning that it is optimal to probe the pool (or an associated electronic system) with a probing parameter that intersects precisely half of the states in the pool. However, the possibility of false-negative results alters the optimal intersection count. An example of a method for identifying the optimal intersection count of a probing parameter is discussed further below with respect to FIG. 4.

As used throughout the disclosure, the term "optimal" shall mean "preferred" and/or an intersection count that is determined in accordance with the techniques described further below.

Figure 3:
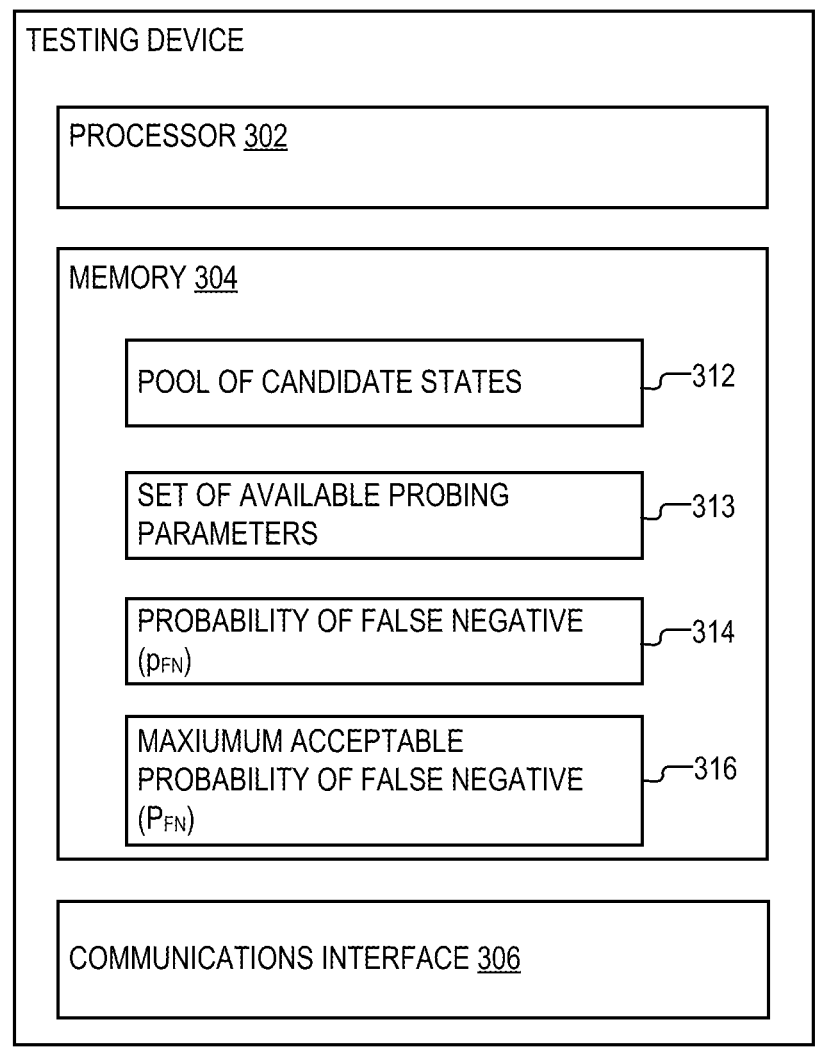
FIG. 3 is a diagram of an example of a testing device, according to aspects of the disclosure.

FIG. 3 is a diagram of the testing device 102, according to aspects of the disclosure. As illustrated, the testing device 102 may include a processor 302, a memory 304, and a communications interface 306. The processor 302 may include any of: one or more a general-purpose processor (e.g., an x86 or an ARM-based processor, etc.), one or more application-specific integrated circuits (ASICs), one or more field-programmable gate arrays (FPGAs) and/or any other suitable type of processing circuitry. The memory 304 may include any suitable type of volatile or non-volatile memory. In some implementations, the memory 304 may include one or more of a Hard Disk, a solid-state drive (SSD), an Electrically Erasable Programmable Read-Only Memory (EEPROM), a Synchronous Dynamic Random-Access Memory (SDRAM), and/or any other suitable type of memory. The communications interface may include one or more of a wireless transceiver, a wired transceiver, an optical transceiver, a network card, a 5G interface, a WiFi interface, and/or any other suitable type of communications interface.

The memory may be configured to store a pool of candidate states 312, a set of probing parameters 313, a value 314 of the probability $p_{FN}$ that a probe of the electronic system 104 would yield a false-negative result, and a value 316 of the maximum acceptable probability $P_{FN}$ that a probe of the electronic system 104 would yield a negative result.

The pool 312 may identify a plurality of states that can be assumed by the electronic system 104. In some implementations, one and only one of the states identified in the pool 312 may be assumed by the electronic system 104 at any given time. In some implementations, the pool 312 may identify a complete set of states of the electronic system 104, such that at any given time, the electronic system 104 is guaranteed to be in one of the states identified in the pool 312. Alternatively, in some implementations, the pool 312 may identify only a portion of the complete set of states. According to the present example, the pool 312 includes a plurality of state identifiers, wherein each of the state identifiers identifies a different one of the states 201-208, which are discussed above with respect to FIG. 2. Additionally or alternatively, in some implementations, the pool 312 may include a plurality of state definitions. Each of the state definitions may define a different respective state. For instance, each of the state definitions may identify a frequency range (or a range of another quantity), which represents the definition's respective state.

The set of probing parameters 313 may include a plurality of probing parameters that can be used to identify the current state of the electronic system 104. In some implementations, the set of probing parameters may be generated by: (i) for each (or at least some) of the states in the pool 312, identifying one or more probing parameters that intersects the state, and (ii) adding each of the probing parameters to the set 313. It will be understood that the present disclosure is not limited to any specific method for composing the set of probing parameters.

The value 314, as noted above, may identify the probability $p_{FN}$ that a probe of the electronic system 104 would yield a false-negative result. As noted above, a probe of the electronic system 104 may generate a false-negative result when the electronic system 104 fails to send a response (to the probe) soon enough for the response to be received within a timeout period or when the response fails to reach the testing device 102 due to noise, traffic congestion, or some other obstruction. The probability of a false-negative may be determined empirically, or may be known a priori due to knowledge of the electronic system 104.

The value 316, as noted above, may identify the maximum acceptable probability $P_{FN}$ that a probe of the electronic system 104 would yield a false-negative result. The maximum acceptable probability may be part of the design specification of the electronic system 104. In some respects, the maximum acceptable probability may be a performance requirement of the testing system 102. Specifically, the probability $p_{FN}$ refers to the rate at which the electronic system 104 fails to respond to an in-band probe. On the other hand, the probability $P_{FN}$ refers to a requirement on the rate at which the testing system 102 incorrectly rejects a candidate state from the candidate pool. In other words, $P_{FN}$ may be based on the probability of the testing system 102 incorrectly interpreting and/or processing the result of a probe. In some implementations, $P_{FN}$ may be the probability of the testing system 102 failing to execute step 412 of the process 400 correctly. The process 400 is discussed further below with respect to FIG. 4.

In some respects, $p_{FN}$ may be regarded as a characteristic of the electronic system 104 (and or the communications channel that connects the electronic system 104 to the testing system 102), while $P_{FN}$ may be a regarded as requirement on the testing system 102 (e.g., a requirement that specifies the maximum probability of the testing system 102 incorrectly recognizing the result of a probe). For instance, the electronic system 104 may have a false-negative probability (i.e., $p_{FN}$) of 50%, while the testing system 102 may have a requirement of a maximum false-negative probability (i.e., $P_{FN}$) of 1%. In some implementations, as is discussed further below with respect to step 414 of the process 400, the testing system 102 can reach its $P_{FN}$ requirement by re-trying the same probe several times in a row when the probe produces a negative result (e.g., either a true-negative or false-negative result, etc.).

Figure 4:
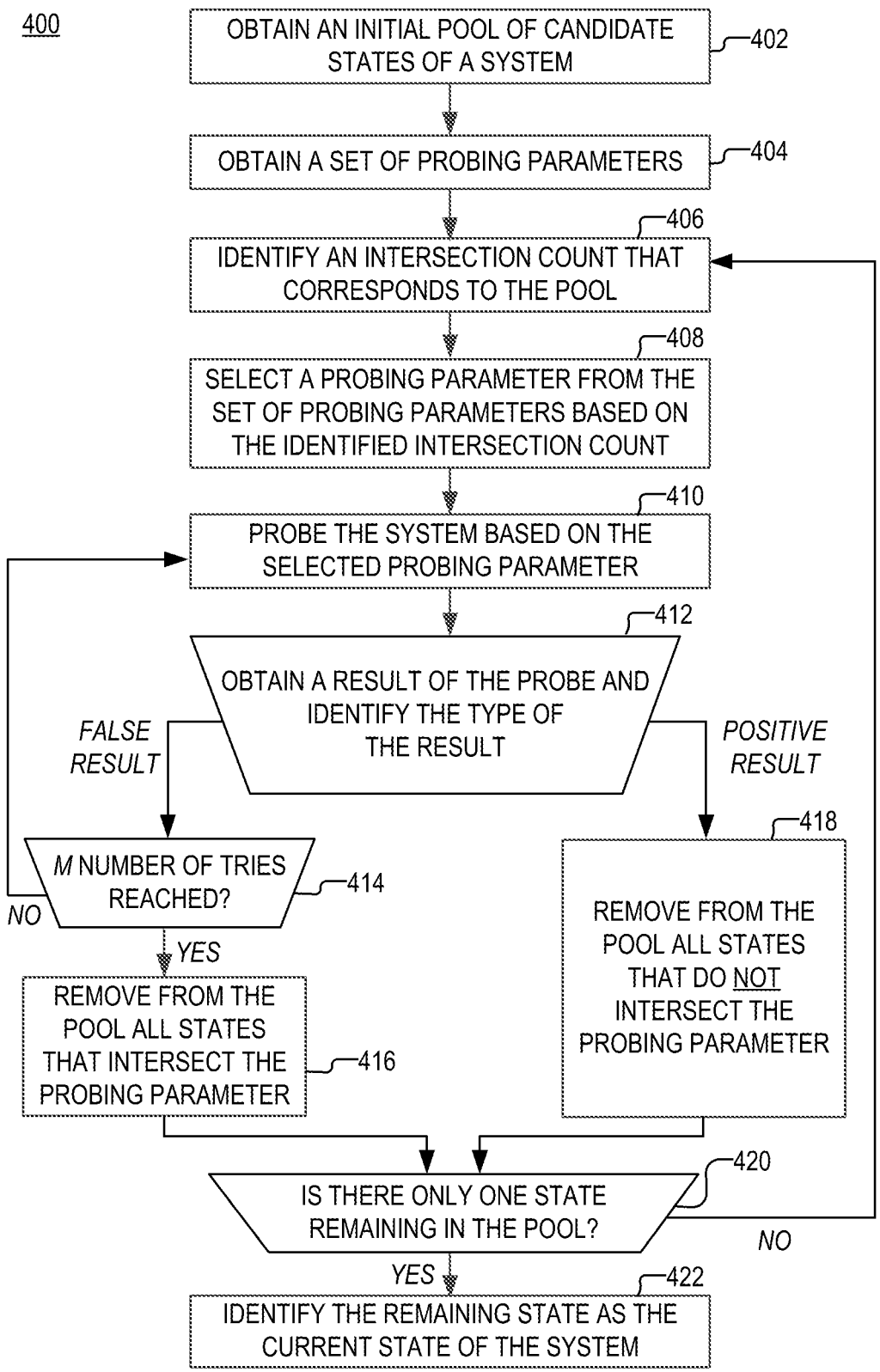
FIG. 4 is a flowchart of an example of a process, according to aspects of the disclosure.

FIG. 4 is a flowchart of an example of a process 400, according to aspects of the disclosure.

At step 402, the processor 302 obtains an initial pool of candidate states of the electronic system 104. According to the present example, the processor 302 retrieves the pool 312 from the memory 304.

At step 404, the processor 302 obtains a set of probing parameters. According to the present example, the processor 302 retrieves the set 313 from the memory 304.

At step 406, the processor identifies a preferred intersection count that corresponds to the pool of candidate states 312. In some implementations, the intersection count may be determined by minimizing Equation 1, which is discussed in further detail below. The preferred intersection count identified at step 406 corresponds to the pool 312 at the time when step 406 is executed. As is discussed further below, the pool 312 may change before each subsequent iteration of step 406.

At step 408, the processor 302 selects a probing parameter based on the preferred intersection count (identified at step 404). In some implementations, step 404 may be performed by: (a) identifying the respective intersection count of each probing parameter in the set 313, (b) identifying the respective distance between each of the intersection counts and the preferred intersection count, (c) and selecting the probing parameter whose intersection count is situated at the shortest distance from the preferred intersection count. When the preferred intersection count is expressed as a fraction of the total number of candidate states that are currently in the pool 312, the preferred intersection count may be converted to an absolute count before step 408 is performed. When a probing parameter has an intersection count that is equal to the preferred intersection count (identified at step 404), the distance between the two intersection counts may be equal to 0. In other words, the probing parameter identified at step 406 may have an intersection count that is equal to or is the closest to (from among all other probing parameters in the set 313) to the preferred intersection count. In some implementations, the probing parameter may be removed from the set 313 (or alternatively tagged) after it is selected in order to prevent it from being selected again during a subsequent iteration of step 406.

At step 410, the processor 302 probes the electronic system 104 based on the probing parameter (identified at step 406).

At step 412, the processor 302 identifies a result that is yielded by the probe (executed at step 410) and determines the type of the result. If the probe (executed at step 410) yields a negative result (which could be either a true-negative or a false-negative), the process 400 proceeds to step 414. Otherwise, if the probe (executed at step 410) yields a positive result, the process 400 proceeds to step 418.

At step 414, the processor 302 detects whether a predetermined number of tries has been reached with respect to the probing parameter (selected at step 408). Specifically, the processor 302 detects whether it has already probed the electronic system 104 M times based on the probing parameter (selected at step 408). According to the present example, M is a positive integer greater than or equal to one. By way of example, in some implementations, the value of M may be determined based on based on Equation 3 below. If the processor 302 has probed the electronic system 104 fewer than M times based on the probing parameter (identified at step 406), the process 400 returns to step 408. Otherwise, if the processor has already probed the electronic system 104 M times based on the probing parameter (identified at step 406), the process 400 proceeds to step 416. As noted above, in some implementations, probing the result M times before the proceeding to step 416 may prevent the process 400 from acting on false-negative results.

At step 416, the processor removes, from the pool 312, all candidate states that intersect the probe.

At step 418, the processor 302 removes from the pool all candidate states that do not intersect the probe.

At step 420, the processor 302 determines if there is only one candidate state remaining in the pool 312. If the pool 312, includes more than one candidate state, the process 400 returns to step 406 and a new preferred intersection count is identified that corresponds to what remains of the pool 312 after the most recent execution of step 416 or step 418. Otherwise, if the pool 312 contains only one candidate state, after step 416 or step 418 is executed, the process 400 proceeds to step 422.

At step 422, the last remaining state in the pool 312 is identified as the current state electronic system 104. In some implementations, identifying the last remaining state in the pool 312 as the current state of the electronic system 104 may include storing an indication of the last remaining state in the memory 306. Additionally or alternatively, in some implementations, identifying the last remaining state in the pool 312 as the current state of the electronic system 104 may include transmitting an identifier of the last remaining state to another device, and/or taking any other suitable action.

In the example of FIG. 4, a probing parameter is selected (at step 408) from a set of probing parameters. The set of probing parameters, as noted above, is obtained at step 404.

However, alternative implementations are possible in which the probing parameter is obtained directly from pool of candidate states (obtained at step 402). As noted above, in some implementations, the pool of candidate states (obtained at step 402) may include a set of state definitions, wherein each of the state definitions identifies a frequency range (or a range of another quantity). In such implementations, obtaining the probing parameter from the pool of state definition may include selecting a frequency value (or another quantity), which falls within any of the state definitions, and which has the intersection count identified at step 406. Stated succinctly, the present disclosure is not limited to any specific method for selecting a probing parameter, once the intersection count for the probing parameter is determined.

In some implementations, the preferred intersection count (identified at step 406) by minimizing Equation 1 below:

$$\langle \kappa \rangle = \log\left(\frac{1}{2}\right) \cdot \left( \langle m \rangle \frac{\Omega(X)}{\log(\Omega(X))} + M \frac{1-\Omega(X)}{\log(1-\Omega(X))} \right) \quad (1)$$

$$M \equiv \lceil \log(P_{FN})/\log(p_{FN}) \rceil \quad (2)$$

$$\langle m \rangle \equiv \sum_{q=1}^{M} q \cdot p_{FN}^{q-1} \cdot (1-p_{FN}) + M \cdot \sum_{k=M}^{\infty} (p_{FN})^q \cdot (1-p_{FN}) = \frac{1-(p_{FN})^M}{1-p_{FN}} \quad (3)$$

where $\Omega(X)$ is a fraction of the current count of states in the pool 312 that intersect a probing parameter X, $\langle m \rangle$ is a cost that is associated with a location that is inside a true state of the electronic system, <k> is the expected number of probes before the size of the candidate pool 312 is halved, $P_{FN}$ is the maximum acceptable probability of a false-negative, and $p_{FN}$ is the probability that a probe of the electronic system 104 will yield a false-negative result. In some implementations, the value of $p_{FN}$ may be determined empirically, or it may be known a priori due to knowledge of characteristics of the underlying electronic system 104. Additionally or alternatively, in some implementations, the value of $p_{FN}$ may be an estimate or a placeholder for the probability that a probe of the electronic system 104 will yield a false-negative result. In any event, irrespective of how the value of $p_{FN}$ is set, the Equation 1 is an example of a model that is based on the probability that probing the electronic system 104 would yield a false-negative result. Although in the example of FIG. 4, Equation 1 is used as a basis for selecting a probing parameter (at step 408), it will be understood that the present disclosure is not limited to using any specific model that is based on the probability that probing the electric system 104 would yield a false-negative result. As used throughout the disclosure, the phrase "model based on the probability that probing an electronic system would yield a false-negative result" shall refer to a model that includes, as one of its arguments, a representation of the probability that a probe of an electronic system would yield a false-negative result. As used throughout the disclosure, the phrase "model based on the probability that a result of probing an electronic system would be interpreted incorrectly" shall refer to a model that includes, as one of its arguments, a representation of the probability that the result of a probe would be interpreted incorrectly.

According to the present example, <m> is the expected number of probing actions (for a particular probing parameter) before a true-positive result is obtained. Furthermore, in some implementations, M may be the number of times a probe is repeated (at step 414) before the probe is declared to yield a negative result.

Figure 5A:
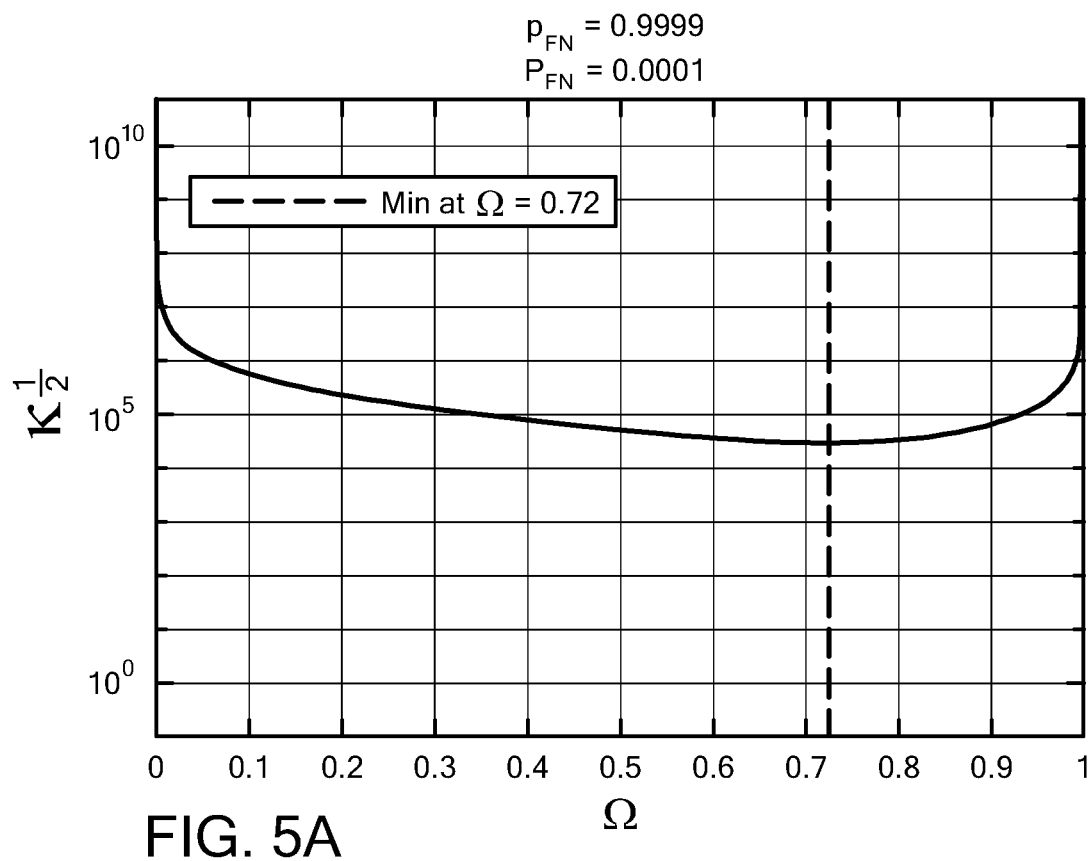
FIG. 5A is a plot of a curve that represents an expected number of probes that it would take to halve the size of a candidate pool of states, according to aspects of the disclosure.
Figure 5B:
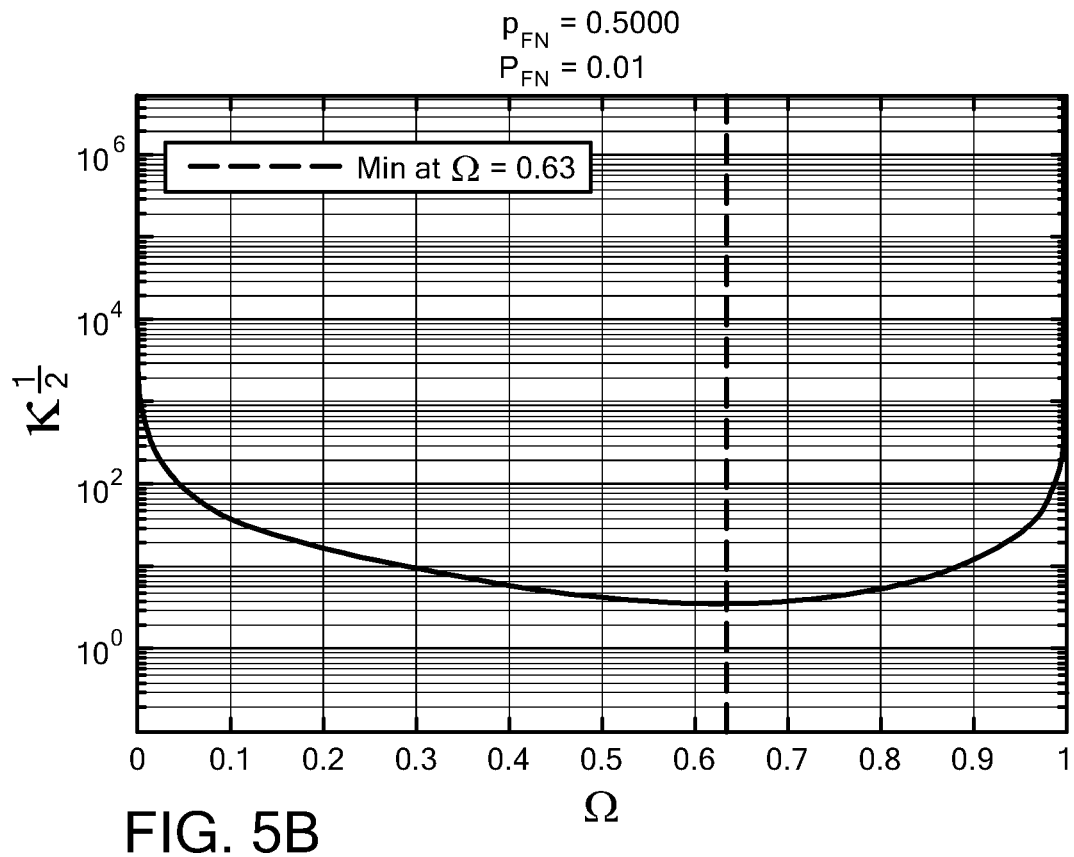
FIG. 5B is a plot of a curve that represents an expected number of probes that it would take to halve the size of a candidate pool of states, according to aspects of the disclosure.

In some implementations, the preferred intersection count (identified at step 406) may be equal the value of $\Omega(X)$ that yields the global minimum of <k>. In this regard, in some implementations, executing step 404, may result in identifying the value of $\Omega(X)$ for which <k> has the lowest possible value. As noted above, the value of <k> is defined by Equation 1. Equation 1, as illustrated by FIGS. 5A and 5B, describes a 1-dimensional convex function. In general, 1-dimensional convex functions can be readily minimized by one of ordinary skill in the art. FIGS. 5A-B show a plot of Equation 1 for different values of $p_{FN}$ and $P_{FN}$. Specifically, FIG. 5A shows that when $p_{FN}$=0.99 and $P_{FN}$=0.0001, the optimal intersection count is equal to 0.72 (i.e., a probe that intersects 72% of the states in the candidate pool will yield the largest expected decrease in the size of the pool). FIG. 5B shows that when $p_{FN}$=0.5 and $P_{FN}$=0.01, the optimal intersection count is equal to 0.63 (i.e., a probe that intersects 63% of the states in the candidate pool will yield the largest expected decrease in the size of the pool).

In some respects, the process 400 identifying preferred intersection count (at step 406) and selecting a probing parameter based on the preferred intersection count (at step 408) allows the discovery of the current state of the electronic system 104 with a minimum expected number of probes. In other words, the process 400 is advantageous because it may reduce the time (or equivalent probe-related resource, such as processor time, or emission power consumption) that it takes to discover the current state of the electronic system 104. Although in the example of FIG. 4 the state of a communications system is discovered, it will be understood that the process 400 is not limited to being used in the communications domain only. Although in the example of FIGS. 1-4, each of the states of the electronic system 104 includes a range of frequencies, it will be understood that in alternative implementations the state of electronic system 104 includes a range of a different quantity and/or a different parameter (or characteristic) of the operation of the electronic system 104. Stated succinctly, the process 400 can be used in any application in which the discovery of the current state of an electronic system is desired, irrespective of how, or in what domain, the state is defined.

FIGS. 1-5B are provided as an example only. At least some of the steps discussed with respect to FIGS. 1-5B may be performed in parallel, in a different order, or altogether omitted. As used in this application, the word "exemplary" is used herein to mean serving as an example, instance, or illustration.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for identifying a current state of an electronic system, comprising:
   identifying a pool of candidate states of the electronic system;
   selecting a probing parameter in accordance with a model that is based on at least one of: (i) a probability that probing the electronic system would yield a false-negative result, or (ii) a probability that a result of probing the electronic system would be interpreted and/or processed incorrectly;
   probing the electronic system based on the selected probing parameter;
   when probing the electronic system based on the selected probing parameter yields a positive result, removing, from the pool, all candidate states that are not intersected by the probing parameter;
   when probing the electronic system based on the selected probing parameter yields M negative results, removing, from the pool, all candidate states that are intersected by the probing parameter, where M is an integer, and M≥1; and
   identifying a last remaining candidate state in the pool as the current state of the electronic system.

2. The method of claim 1, further comprising, when probing the electronic system based on the selected probing parameter has yielded less than M negative results, probing the electronic system again based on the selected probing parameter.

3. The method of claim 1, wherein selecting the probing parameter includes selecting a probing parameter that is expected to minimize a number of probing actions that are necessary to halve the size of the pool.

4. The method of claim 1, wherein the electronic system includes a communications system, the selected probing parameter includes a frequency, and probing the electronic system based on the selected probing parameter includes transmitting a signal to the electronic system at the frequency.

5. The method of claim 1, wherein probing the electronic system based on the selected probing parameter includes transmitting to the electronic system a message that includes an indication of the selected probing parameter.

6. The method of claim 1, wherein the value of M is determined in accordance with the following expression:

$$M = \lceil \log(P_{FN})/\log(p_{FN}) \rceil$$

where $P_{FN}$ is the probability that the result of probing the electronic system would be interpreted and/or processed incorrectly, and $p_{FN}$ is the probability that probing the electronic system would yield a false-negative result.

7. The method of claim 6, wherein the probing parameter is selected by minimizing the following expression with respect to X:

$$\langle \kappa \rangle = \log\left(\frac{1}{2}\right) \cdot \left( \langle m \rangle \frac{\Omega(X)}{\log(\Omega(X))} + M \frac{1 - \Omega(X)}{\log(1 - \Omega(X))} \right)$$

where $\langle \kappa \rangle$ is an expected number of probes before the size of the pool of candidate states is halved, $\langle m \rangle$ is a cost that is associated with a location that is inside a true state of the electronic system, and $\Omega(X)$ is a fraction of states in the pool of candidate states that are intersected by probing parameter X.

8. The method of claim 7, wherein the value of $\langle m \rangle$ is determined in accordance with the following expression:

$$\langle m \rangle \equiv \frac{1 - (p_{FN})^{\wedge} M}{1 - p_{FN}}$$

wherein $p_{FN}$ is the probability that probing the electronic system would yield a false-negative result.

9. An apparatus, comprising:
a memory; and
at least one processor that is operatively coupled to the memory, the at least one processor being configured to perform the operations of:
identifying a pool of candidate states of an electronic system;
selecting a probing parameter in accordance with a model that is based on at least one of: (i) a probability that probing the electronic system would yield a false-negative result, or (ii) a probability that a result of probing the electronic system would be interpreted and/or processed incorrectly by the apparatus;
probing the electronic system based on the selected probing parameter;
when probing the electronic system based on the selected probing parameter yields a positive result, removing, from the pool, all candidate states that are not intersected by the probing parameter;
when probing the electronic system based on the selected probing parameter yields M negative results, removing, from the pool, all candidate states that are intersected by the probing parameter, where M is an integer, and M≥1; and
identifying a last remaining candidate state in the pool as a current state of the electronic system.

10. The apparatus of claim 9, wherein the at least one processor is further configured to perform the operation of, when probing the electronic system based on the selected probing parameter has yielded less than M negative results, probing the electronic system again based on the selected probing parameter.

11. The apparatus of claim 9, wherein selecting the probing parameter includes selecting a probing parameter that is expected to minimize a number of probing actions that are necessary to halve the size of the pool.

12. The apparatus of claim 9, wherein the electronic system includes a communications system, the selected probing parameter includes a frequency, and probing the electronic system based on the selected probing parameter includes transmitting a signal to the electronic system at the frequency.

13. The apparatus of claim 9, wherein probing the electronic system based on the selected probing parameter includes transmitting to the electronic system a message that includes an indication of the selected probing parameter.

14. The apparatus of claim 9, wherein the value of M is determined in accordance with the following expression:

$$M = \lceil \log(P_{FN})/\log(p_{FN}) \rceil$$

where $P_{FN}$ is the probability that the result of probing the electronic system would be interpreted and/or processed incorrectly by the apparatus, and $p_{FN}$ is the probability that probing the electronic system would yield a false-negative result.

15. The apparatus of claim 9, wherein the probing parameter is selected by minimizing the following expression with respect to X:

$$\langle \kappa \rangle = \log\left(\frac{1}{2}\right) \cdot \left( \langle m \rangle \frac{\Omega(X)}{\log(\Omega(X))} + M \frac{1 - \Omega(X)}{\log(1 - \Omega(X))} \right)$$

where $\langle \kappa \rangle$ is an expected number of probes before the size of the pool of candidate states is halved, $\langle m \rangle$ is a cost that is associated with a location that is inside a true state of the electronic system, and $\Omega(X)$ is a fraction of states in the pool of candidate states that are intersected by probing parameter X.

16. The apparatus of claim 15, wherein the value of $\langle m \rangle$ is determined in accordance with the following expression:

$$\langle m \rangle \equiv \frac{1 - (p_{FN})^{\wedge} M}{1 - p_{FN}}$$

where $p_{FN}$ is the probability that probing the electronic system would yield a false-negative result.

17. A non-transitory computer-readable medium that stores one or more processor-executable instructions, which, when executed by at least one processor, cause the at least one processor to perform the operations of:
identifying a pool of candidate states of an electronic system;
selecting a probing parameter in accordance with a model that is based on at least one of: (i) a probability that probing the electronic system would yield a false-negative result, or (ii) a probability that a result of probing the electronic system would be interpreted and/or processed incorrectly by the at least one processor;

when probing the electronic system based on the selected probing parameter yields a positive result, removing, from the pool, all candidate states that are not intersected by the probing parameter;

when probing the electronic system based on the selected probing parameter yields M negative results, removing, from the pool, all candidate states that are intersected by the probing parameter, where M is an integer, and $M \geq 1$; and identifying a last remaining candidate state in the pool as a current state of the electronic system.

18. The non-transitory computer-readable medium of claim 17, wherein the one or more processor-executable instructions further cause the at least one processor to perform the operation of, when probing the electronic system based on the selected probing parameter has yielded less than M negative results, probing the electronic system again based on the selected probing parameter.

19. The non-transitory computer-readable medium of claim 17, wherein selecting the probing parameter includes selecting a probing parameter that is expected to minimize a number of probing actions that are necessary to halve the size of the pool.

20. The non-transitory computer-readable medium of claim 17, wherein the electronic system includes a communications system, the selected probing parameter includes a frequency, and probing the electronic system based on the selected probing parameter includes transmitting a signal to the electronic system at the frequency.

\* \* \* \* \*